Figure 1:
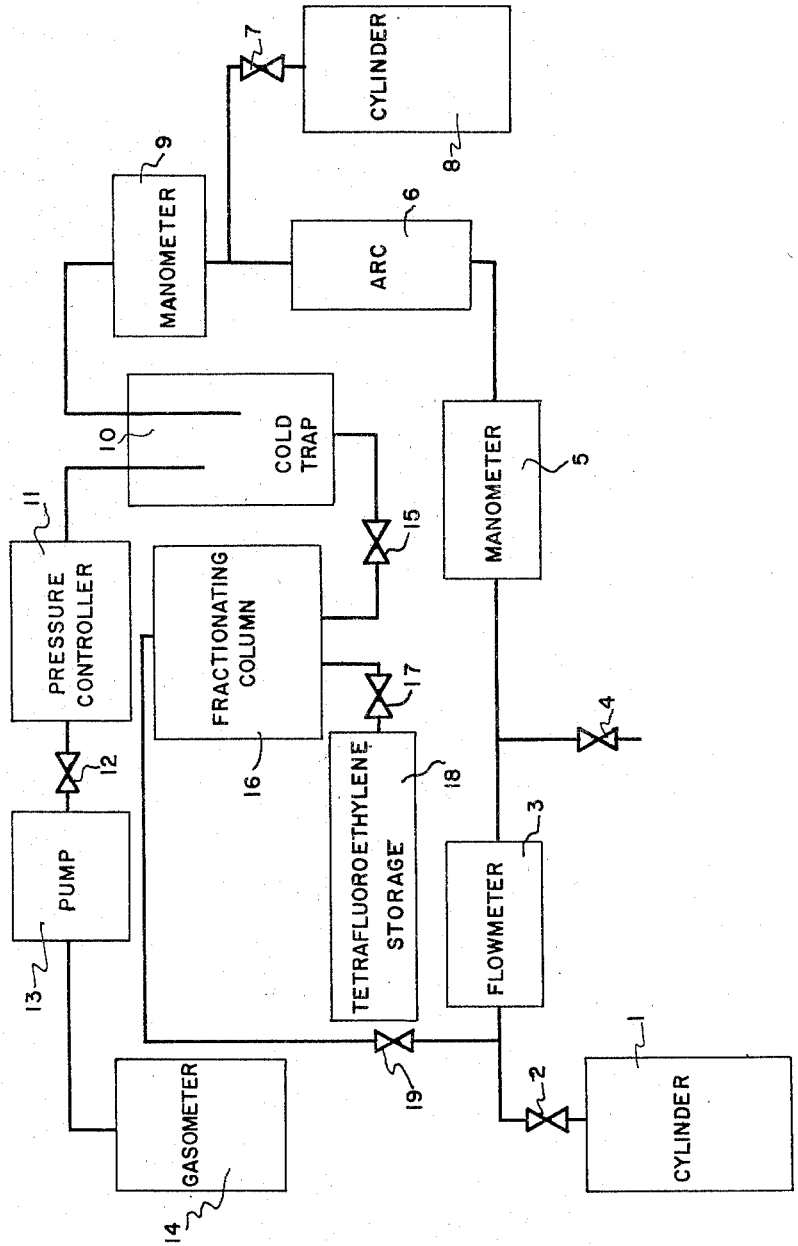

INVENTORS
MARK W. FARLOW
EARL L. MUETTERTIES
BY
ATTORNEY

United States Patent Office 2,709,191
Patented May 24, 1955

2,709,191

PREPARATION OF TETRAFLUOROETHYLENE BY REACTING CARBON WITH A BINARY SILICON FLUORIDE

Mark W. Farlow, Holly Oak, and Earl L. Muetterties, Hockessin, Del., assignors to E. I. du Pont de Nemours & Company, Wilmington, Del., a corporation of Delaware Application May 14, 1954, Serial No. 429,836

6 Claims. (Cl. 260—653)

This invention relates to a new process for preparing tetrafluoroethylene. The present application is a continuation-in-part of applicants' copending applications Serial No. 368,444, filed July 16, 1953, now abandoned, and Serial No. 409,484, filed February 10, 1954.

Compounds containing only carbon and fluorine (hereinafter referred to as fluorocarbons for the sake of brevity) are known to possess considerable usefulness in many fields of applied chemistry. For example, they have demonstrated utility as dielectrics, plastics, surface active agents, and the like. In particular, tetrafluoroethylene has already achieved commercial success in the form of its polymer. However, the lack of an economical synthesis has prevented the development of really large markets for fluorocarbons.

An object of the present invention is to provide a new process of synthesizing tetrafluoroethylene. A further object is to provide an economical process for such synthesis. Other objects will be apparent from the description of the invention given hereinafter.

The above objects are accomplished according to the present invention by reacting carbon at the temperature of the carbon arc with a binary fluoride of silicon, and rapidly cooling the resultant reaction mixture to a temperature below about 400° C.

In a preferred form of the invention, the fluorocarbons formed, including tetrafluoroethylene, are separated from the cooled reaction mixture and the unreacted silicon fluoride is recycled. In this latter embodiment, high conversions of the silicon fluoride to tetrafluoroethylene are achieved.

The starting materials suitable for the process of this invention are the binary fluorides of silicon, of which the best known ones are silicon tetrafluoride, $SiF_4$, and silicon subfluoride (hexafluorodisilane), $Si_2F_6$. Both of these silicon fluorides are gases under normal conditions, and therefore particularly suitable for use in the process of this invention. Moreover, silicon tetrafluoride is a very cheap starting material since it is obtainable from silica, calcium fluoride and sulfuric acid. Hexafluorodisilane can be prepared for example, by reacting hexachlorodisilane with zinc fluoride, as described by Schumb and Gamble in J. Am. Chem. Soc. 54, 583 (1933).

Instead of using preformed silicon tetrafluoride, it is possible to use metal fluosilicates which are known (J. H. Simons, "Fluorine Chemistry," 1950) to dissociate at relatively low temperatures to give silicon tetrafluoride. For example, barium fluosilicate is extensively dissociated at 400–500° C. and sodium fluosilicate at 500–700° C. For the purpose of liberating silicon tetrafluoride in situ, any metal fluosilicate in anyhdrous form can be used, preferably the silicates of the alkali and alkaline earth metals.

The pyrolysis reaction normally gives a mixture of fluorocarbons, the preponderant components of which are tetrafluoroethylene and carbon tetrafluoride, with minor amounts of other fluorocarbons such as hexafluoroethane. Carbon tetrafluoride is a valuable by-product since, after separating it from the tetrafluoroethylene, it can be used as a further source of tetrafluoroethylene by reacting it with carbon at carbon arc temperature, as described in copending application Serial No. 390,441, filed by M. W. Farlow on November 6, 1953. Another by-product of the reaction is elemental silicon, which is obtained in an active form as a brown-black, very finely divided pyrophoric solid, reacting spontaneously with air or oxygen to give silica.

The reaction proceeds only at very high temperatures, such as are obtained in a carbon arc, where the temperature is estimated to be in the range from 2500 to 3500–4000° C., or even higher.

In a preferred embodiment of the invention, the process is carried out by passing the gaseous silicon fluoride through the arc produced by passing an electric current between carbon electrodes, rapidly quenching the reaction mixture to minimize decomposition of the tetrafluoroethylene formed, separating the fluorocarbons from the reaction mixture, and recycling the unreacted silicon fluoride.

If it is desired to produce silicon tetrafluoride in situ, this can be done, for example, by blowing a finely divided, anhydrous metal fluosilicate through the carbon arc, or by imbedding the fluosilicate in one of the electrodes, or by other suitable means.

The carbon used in the reaction is preferably in the form of the graphite electrodes of an electric arc. However, other forms of carbon can be used. For example, very finely divided active carbon can be blown through the arc together with the silicon fluoride.

Practical conversions to tetrafluoroethylene can be obtained only if the product from the hot reaction zone is quenched rapidly to a temperature of 400° C. or below. While the chemical processes that occur during quenching are not well understood, it has been demonstrated that quenching of the product from the reaction temperature to a temperature no higher than about 400° C. is essential to the success of the process. The time during which the reaction mixture is cooled, i. e., the time of transition from the reaction temperature to 400° C. should not exceed one second. It is preferably in the range 0.001 to 0.1 second. This can be achieved by suitable adjustment of the rate of flow of the silicon fluoride through the arc and cooling of the product gases by conventional means.

It is known that carbon arcs can be operated at low or high voltages and with either direct or alternating current. All of these various arc operating conditions can be employed in the process of this invention. Especially good results in the pyrolysis process are obtained when the silicon fluoride is passed through arcs produced between carbon electrodes by an electric current of from 10 to 50 volts and of 10 to 30 amperes. The process, however, is not limited to the use of these specific operating conditions.

The absolute pressure of the reaction gases during pyrolysis is not critical. In general, however, low pressures of the order of 1 to 150 mm. of mercury are preferred when the silicon fluoride is pyrolyzed in an electric arc since the operation of the arc becomes more difficult with increase in pressure, although atmospheric or even superatmospheric pressures can be used if desired.

The optimum rate of flow of the reactant gas through the reaction zone depends on the electric power input to the arc. The greater the electric power input, the greater is the rate of flow which can be employed. In any event, the rate of flow must be sufficient to insure that the time of transition from the reaction temperature to about 400° C. does not exceed one second.

The separation of the various components of the reaction mixture can be accomplished by fractional low temperature distillation. The first component so removed is carbon tetrafluoride (B. P. —128° C.). The remainder consists essentially of a mixture of unreacted silicon fluoride and tetrafluoroethylene, with minor amounts of other fluorocarbons. When the silicon fluoride is silicon tetrafluoride, this mixture is best fractionated at superatmosprehic pressures, for example, of the order of 2–3 atmospheres, since silicon tetrafluoride then boils above its melting point. The silicon tetrafluoride distills first, leaving the tetrafluoroethylene as the higher boiling component. When hexafluorodisilane is used, it is the highest boiling component of the reaction mixture (B. P. —19° C.). The various components of the reaction mixture can also be separated by selective solvent extraction or by selective adsorption on solids. If it is not desired to recycle the silicon fluoride, it can be conveniently separated from the fluorocarbons by washing the reaction mixture with aqueous alkali. Alternatively, the entire reaction mixture can be recycled without previous separation.

Figure 2:
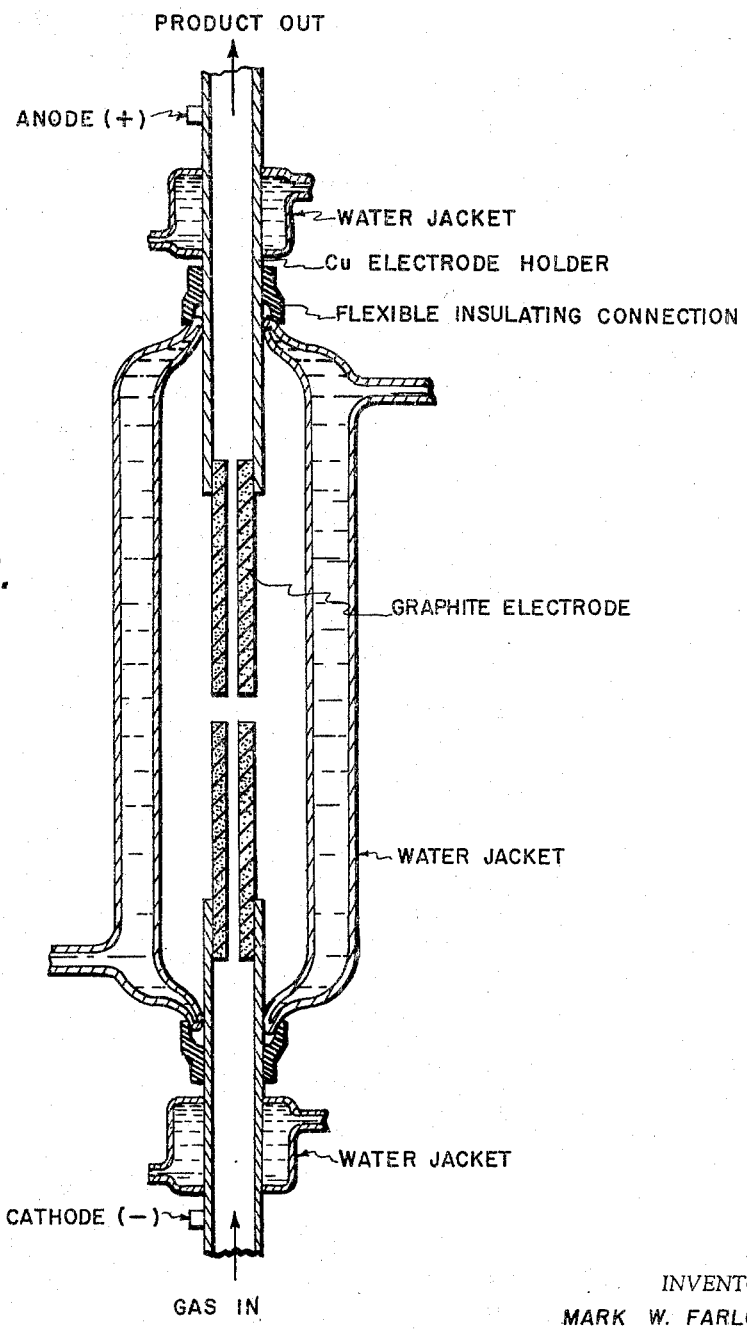
Figure 3:
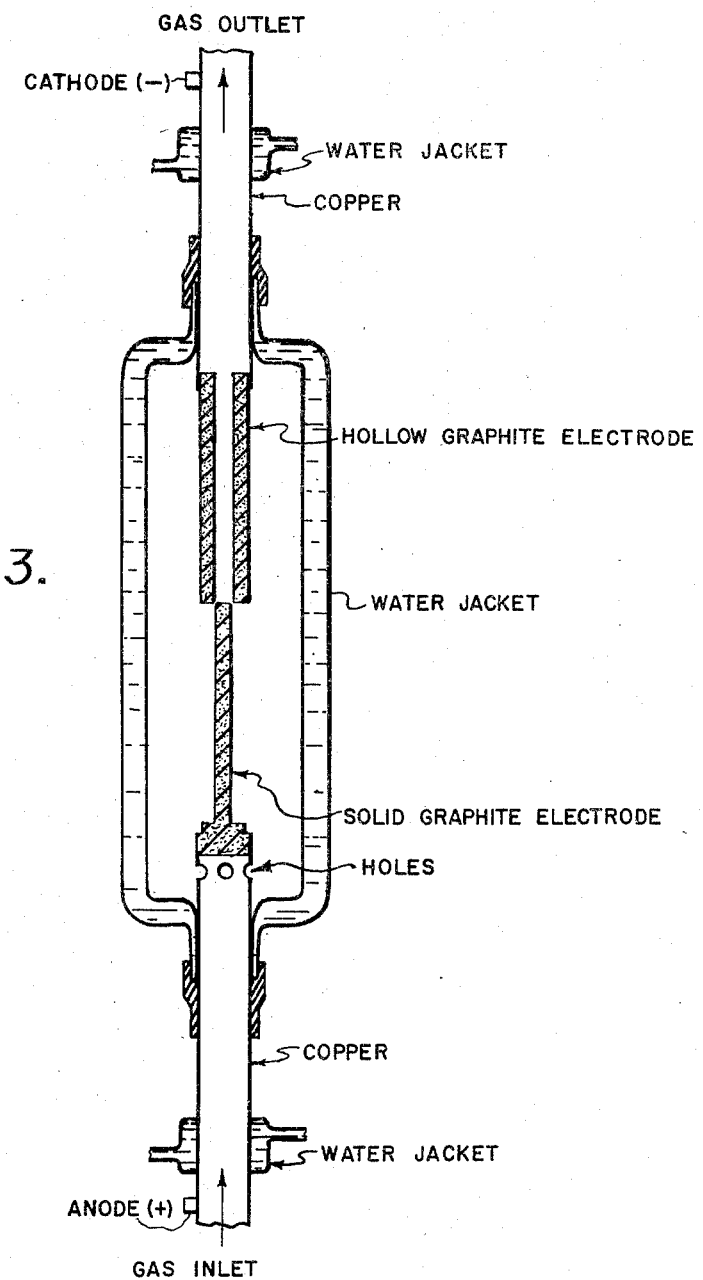

A flow sheet of the arc equipment and process used is shown in Figure 1. A detail of an arc used with gaseous reactants is shown in Figure 2. A detail of a somewhat different type of arc is shown in Figure 3.

Referring to Figure 1, the gas lines are preferably of copper tubing. In a typical operation, the silicon tetrafluoride is contained in cylinder or tank 1. Valves 2, 4, 15, and 19 are closed, and valves 7 and 12 are opened. The apparatus is evacuated by means of pump 13 to remove the air, trap 10 is cooled, for example with liquid nitrogen, valve 7 is closed, argon (or other inert gas) is admitted through valve 4 to the desired operating pressure, and pressure controller 11 is set to maintain that desired pressure. The arc 6 is struck, valve 2 is opened, the reactant gas is passed through the arc at the desired rate (flowmeter 3) and the product is condensed in trap 10, except for any noncondensable gases which pass through controller 11, pump 13, and into gasometer 14. During operation the arc inlet pressure (manometer 5) will be appreciably higher than the exit pressure (manometer 9) because of the constriction involved in the arc passages. When it is desired to stop the reaction, the arc current is cut off, valves 2 and 12 are closed, valve 7 is opened, cylinder 8 is cooled with liquid nitrogen, trap 10 is allowed to warm to room temperature, and the volatile product is distilled into cylinder 8. Finally, if desired, cylinder 8 can be pumped to remove traces of argon, or other noncondensables, after which the cylinder valve 7 is closed and the product is allowed to warm to room temperature.

The unreacted starting material can be recycled in a semi-continuous or continuous manner in various ways. For example, the operation can be stopped at intervals and the trap 10 warmed up sufficiently to liquefy any solid condensate. The fluid is then sent through valve 15 to fractionating column 16, where the highly volatile carbon tetrafluoride is first separated and sent to a storage tank (not shown); then the unreacted silicon tetrafluoride is separated and sent back through valves 19 and 2 to cylinder 1; and finally the tetrafluoroethylene is separated and sent through valve 17 to tetrafluoroethylene storage 18. Alternatively, cold trap 10 can be a system of two traps of which the first one is at a temperature sufficiently low to condense the tetrafluoroethylene and the silicon tetrafluoride, but not the carbon tetrafluoride, which is condensed in the second trap, maintained at very low temperature. The first trap is connected through valve 15 to fractionating column 16, which continuously separates the unreacted silicon tetrafluoride and sends it back to the arc through valve 19 and flowmeter 3, while the higher boiling tetrafluoroethylene is sent through valve 17 to tetrafluoroethylene storage 18.

Optionally, the elemental silicon which forms during the operation can be collected in a suitable separator (not shown) interposed between arc 6 and manometer 9. If such a device is not used, most of the silicon will collect in cold trap 10.

A detail of an arc suitable for use with gaseous reactants is shown in section in Figure 2. The electrodes consist of hollow graphite cylinders, the longitudinal holes of which serve to let the reactant gas in the arc and the product gas out of the arc. In the figure, the gas is shown entering through the cathode and leaving through the anode, but this direction of flow can be reversed with equally good results. The electrodes are mounted in sections of copper tubing. Encasing the electrodes is a glass water jacket held in position by flexible rubber connections, thereby forming a gas-tight compartment around the electrodes. Water jackets are also provided, outside the arc chamber, on the copper tubings holding the electrodes. These jackets are made of electrically nonconductive material or, if they are made of electrically conductive material, they are insulated from the electrode holders. The arc is struck by contacting the two electrodes through manipulation of one of the two flexible rubber connections, care being taken to avoid contact with uninsulated portions of the apparatus. Thereafter the electrode gap is controlled to attain the requisite current. Either direct or alternating current can be applied across the electrodes at widely varying voltages. In the case of alternating current, the frequency can be varied over a wide range. Good results are obtained when a direct current of 10 to 30 amperes at 10 to 50 volts is employed. However, the process is not limited to the use of this narrow range of amperage and voltage.

Figure 3 shows in section another form of carbon arc which has been found to give steady conversions to fluorocarbons. The external features of this arc are the same as in Figure 2, except that one of the electrode holders (the one holding the anode in Figure 3) has no outlet leading into the anode, which is a solid graphite cylinder. This electrode holder, which serves as the gas inlet, is perforated at the end holding the anode. The incoming gas flows around the anode and enters the cathode, which is a hollow graphite cylinder, the opening of which is flush with the end of the solid anode. The gas passes through the burning ac at this point, enters the hollow cathode and goes out through the copper cathode holder.

Variations on the type of arc just described include (a) operating with the solid anode plunged into the hollow cathode for a greater or lesser distance, i. e., with the cathode at least partly surrounding the anode; (b) using the solid electrode as the cathode and the hollow one as the anode; (c) using a solid electrode of the same or larger diameter as the outside diameter of the hollow electrode, the two electrodes being separated by a narrow gap.

The following examples in which parts are by weight are illustrative of the invention.

*Example I*

Gaseous silicon tetrafluoride was passed through a carbon arc (Figures 1 and 2) at a rate of about 50 g./hr., an arc inlet pressure of 20 to 50 mm. of mercury, absolute, and an arc exit pressure of about 7 to 8 mm. The arc was operated at 20 to 25 volts (D. C.) and 18–20 amperes. After four recycles of the product (five passes in all), the product gas was washed with aqueous alkali to remove unchanged silicon tetrafluoride, and the residual gas consisted of fluorocarbons in the ratio of 70 parts by volume of tetrafluoroethylene, 90 parts of carbon tetrafluoride, and one part of hexafluoroethane. The tetrafluoroethylene can be readily separated from this mixture by fractional distillation.

*Example II*

Using the apparatus illustrated in Figure 3, silicon tetrafluoride was passed through the arc at the rate of 43 g./hr. and at an arc inlet pressure of 20 to 100 mm. of mercury absolute. The arc was operated at 20–22 volts (D. C.) and 24–27 amperes. The resultant gaseous reaction product contained, in addition to unchanged silicon tetrafluoride, 1.4% by volume of tetrafluoroethylene and 0.7% by volume of carbon tetrafluoride. The tetrafluoroethylene can be separated from the reaction mixture by fractional distillation.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of tetrafluoroethylene which comprises reacting carbon at carbon arc temperature with a binary silicon fluoride and rapidly quenching the reaction gases to a temperature not higher than 400° C.

2. The process for the preparation of tetrafluoroethylene which comprises reacting carbon at carbon arc temperature with silicon tetrafluoride and rapidly quenching the reaction gases to a temperature not higher than 400° C.

3. The process for the preparation of tetrafluoroethylene which comprises reacting carbon at carbon arc temperature with a binary silicon fluoride, rapidly quenching the reaction gas to a temperature below 400° C., separating the fluorocarbons therefrom, and recycling the silicon fluoride.

4. The process for the preparation of tetrafluoroethylene which comprises reacting carbon at carbon arc temperature with a binary silicon fluoride and cooling the reaction gases below 400° C. within one second.

5. The process for the preparation of tetrafluoroethylene which comprises reacting carbon at carbon arc temperature with a binary silicon fluoride and rapidly quenching the reaction gases to a temperature not higher than 400° C. within one-tenth second.

6. The process for the preparation of tetrafluoroethylene which comprises reacting carbon at carbon arc temperature with a binary silicon fluoride, cooling the reaction gases below 400° C. within one second, separating the fluorocarbons and recycling the silicon fluoride.

No references cited.